United States Patent
Hofmann et al.

(10) Patent No.: US 6,170,919 B1
(45) Date of Patent: Jan. 9, 2001

(54) VEHICLE SUSPENSION ASSEMBLY

(75) Inventors: Heinrich Hofmann, Schweinfurt; Rainer Breitenbach, Gochsheim; Harald Merklein, Schweinfurt; Peter Niebling, Bad Kissingen, all of (DE); Fritz Mahnig, Schaffhausen (CH); Guido Rau, Konstanz (DE)

(73) Assignee: Georg Fischer Fahrzeugtechnik AG, Schaffhausen (CH)

( * ) Notice: Under 35 U.S.C. 154(b), the term of this patent shall be extended for 0 days.

(21) Appl. No.: 09/160,132

(22) Filed: Sep. 24, 1998

(30) Foreign Application Priority Data

Sep. 24, 1997 (DE) .............................................. 197 42 027

(51) Int. Cl.⁷ ...................................................... B60B 27/00
(52) U.S. Cl. ........................................ 301/105.1; 384/544
(58) Field of Search ............................. 301/105.1, 124.1, 301/125, 126, 137; 180/258, 259; 384/517, 537, 544; 464/178; 29/894.361, 898.09, 898.07

(56) References Cited

U.S. PATENT DOCUMENTS

| 4,359,128 | * 11/1982 | Krude ..................................... 180/258 |
| 4,491,340 | 1/1985 | Von Grünberg et al. ............ 280/668 |
| 5,651,588 | * 7/1997 | Kato ............................... 301/105.1 X |

FOREIGN PATENT DOCUMENTS

| 3340442 | 6/1984 | (DE) . |
| 195 38 212 | 4/1997 | (DE) . |

* cited by examiner

*Primary Examiner*—Russell D. Stormer
(74) *Attorney, Agent, or Firm*—Tarolli, Sundheim, Covell, Tummino & Szabo L.L.P.

(57) ABSTRACT

The invention provides a vehicle suspension assembly in which an inadmissibly high axial bracing or rigging of the bearing assembly is avoided. For this purpose, the wheel support member is provided with an elastically or plastically deformable protruding rib in the region of the front face of the outer race of the rolling bearing.

4 Claims, 5 Drawing Sheets

VEHICLE SUSPENSION ASSEMBLY

FIELD OF THE INVENTION

The present invention refers to a vehicle suspension assembly comprising a wheel flange member, a rolling bearing assembly having an inner race connected to the wheel flange member and an outer race, and a housing having a cylindrical bore adapted to receive the outer race of the rolling bearing assembly and provided with integrally formed brake support means. Further, there is provided a wheel support member for receiving the housing and screws for interconnecting the housing to the wheel support member in such a way that the rolling bearing that is received in the bore of the housing is simultaneously fixed and biased.

BACKGROUND OF THE INVENTION

The efforts in the automotive industry to save gasoline have led to an increased use of aluminum materials for more and more elements of a vehicle. Even if these light-weight materials have advantages such as corrosion resistance, low weight, etc., some disadvantages are observed, particularly low strength, higher thermal expansion coefficient, lower admissible surface pressure and higher price.

In the field of vehicle wheel suspensions, so-called pivotal bearing assemblies (front) and wheel support members (rear) are used to transfer the forces coming from the shock struts (weight of the vehicle) via the wheel bearings to the wheels and, thus onto the road. Moreover, anchoring points for the steering elements, for the brake saddles as well as for the wishbone are required. The pivotal bearing assemblies are highly stressed elements that play an important role as far as the safety of the vehicle is concerned; moreover, they are highly exposed to corrosion, caused, for example, by road salt.

PRIOR ART

The Published German Patent Applications DE-OS 33 40 442 and DE-OS 195 38 212 disclose designs of suspension assemblies. However, a great danger exists that high forces generated by screwing together the parts and elements of these inventions will cause certain parts and elements to be biased inadmissibly high, with the possible result that even stop shoulders, against which a rolling bearing is pressed may be damaged.

OBJECTS OF THE INVENTION

It is an object of the present invention to provide a vehicle suspension assembly of the kind referred to herein before that does not show the disadvantages mentioned herein above. Particularly, it is an object of the present invention to provide a vehicle suspension assembly of the kind referred to herein before in which inadmissibly high biasing and damage to the rolling bearing assembly and/or the associated parts and elements are avoided.

SUMMARY OF THE INVENTION

To achieve these and other objects, the present invention provides a vehicle suspension assembly that comprises a wheel flange member, a rolling bearing assembly having an inner race connected to the wheel flange member and an outer race, and a housing having a cylindrical bore adapted to receive the outer race of the rolling bearing assembly and provided with integrally formed brake support members.

Further, there is provided a wheel support member for receiving the housing and screws for interconnecting the housing to the wheel support member in such a way that the rolling bearing received in the bore of the housing is simultaneously fixed and biased.

According to a first aspect of the invention, the aforementioned wheel support member is provided with a protruding rib or shoulder that is resiliently deformable. The protruding rib or shoulder is located in the region of the front face of the outer race of the rolling bearing. The protruding rib or shoulder is resiliently deformed upon screwing together the housing and the wheel support member.

According to a second aspect of the invention, the aforementioned housing is provided with a protruding rib or shoulder that is plastically deformable. The protruding rib or shoulder is located in the region of the front face of the outer race of the rolling bearing. The protruding rib or shoulder is plastically deformed upon screwing together the housing and the wheel support member.

Due to the fact that the rolling bearing assembly is press-fitted in a housing that also comprises integrally formed brake support means, e.g. brake support arm members or brake support connection apertures, a good fit of the bearing assembly can be realized. Moreover, such an assembly can be optimized as far as its strength is concerned. The wheel flange can consist of aluminum material, cast iron or steel and can be optimized for light weight. Particularly advantageous is that the rolling bearing assembly is simultaneously fixed and biased in a well defined manner by virtue of axially screwing together the wheel support member and the housing. Due to this biasing of the rolling bearing assembly, micro movements and cracking noises are avoided since part of the moments occurring during driving through bends are axially transmitted through the bearing front faces.

Furthermore, such a design has the further advantage that different brakes and sizes of wheel bearings can be combined with one kind of a pivotal bearing assembly.

BRIEF DESCRIPTION OF THE DRAWINGS

In the following, two embodiments of the vehicle suspension assembly according to the invention will be further described, with reference to the accompanying drawings, in which.

DETAILED DESCRIPTION OF THE PREFERRED EMBODIMENTS

Figure 1:
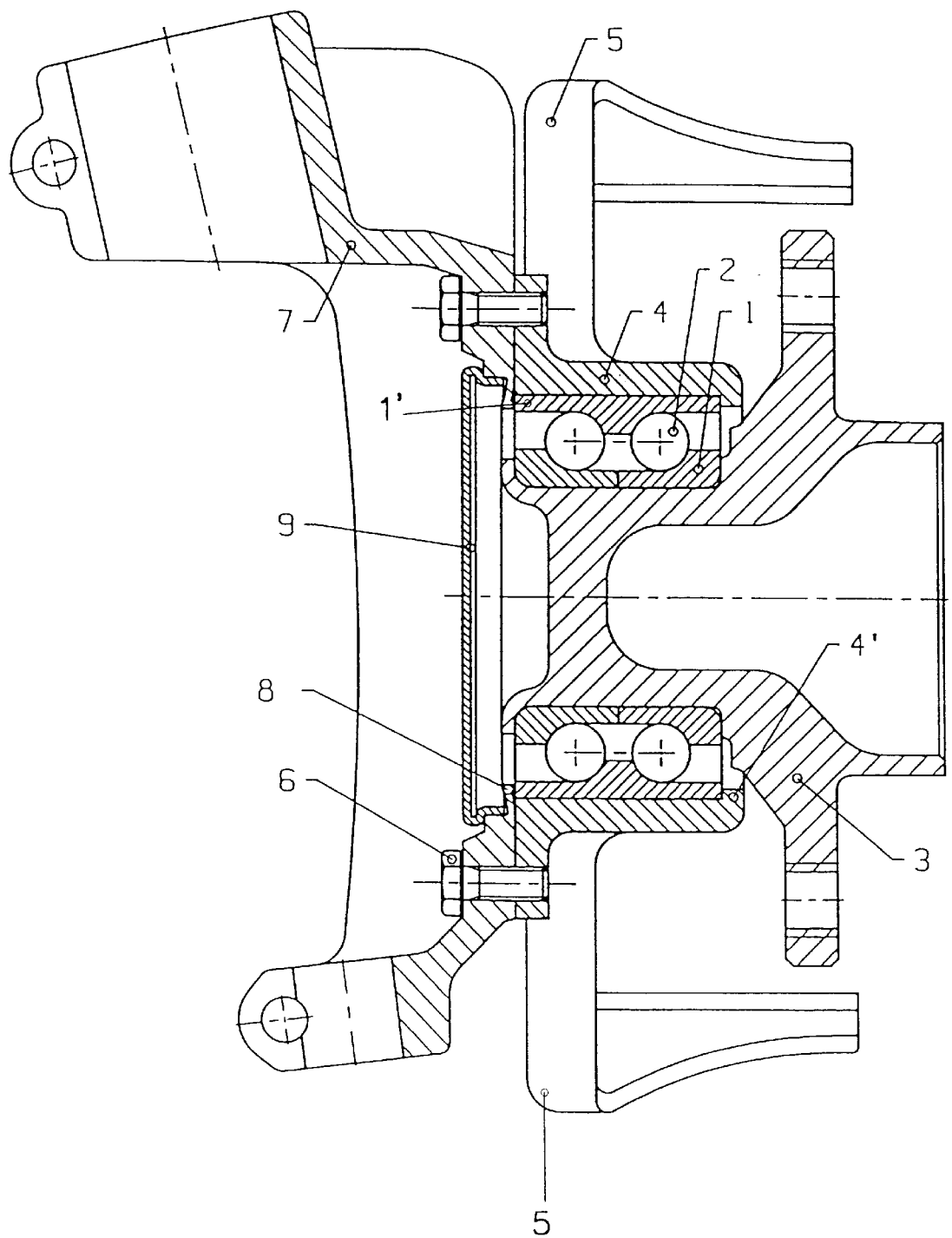
FIG. 1 shows a cross sectional view of a first embodiment of a vehicle suspension assembly according to the invention.
Figure 3:
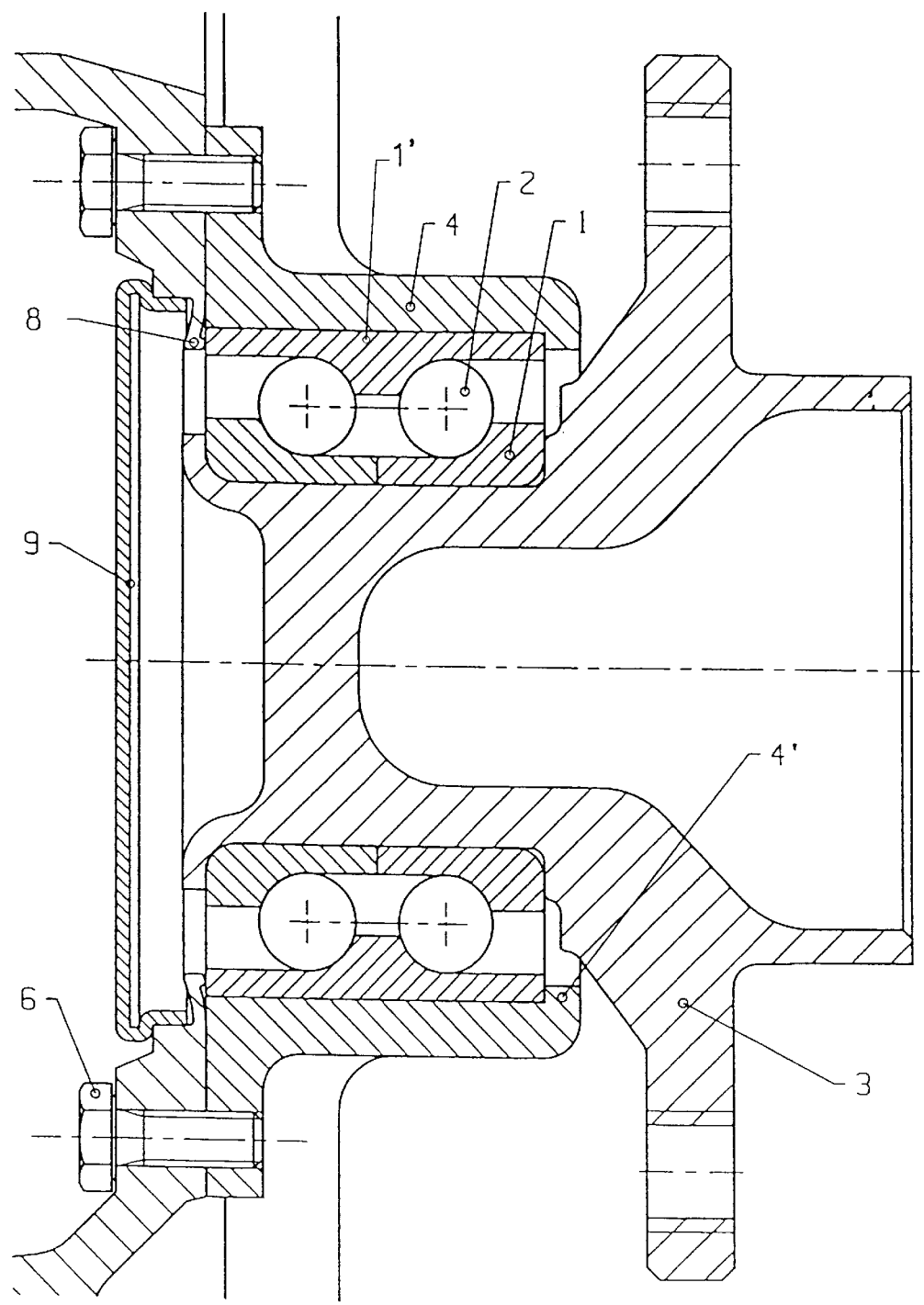
FIG. 3 shows a cross sectional view of a portion of the vehicle suspension assembly of FIG. 1 in a larger scale.

In FIGS. 1 and 3, there are shown cross sectional views of a first embodiment of a vehicle suspension assembly according to the invention. As can be seen from the drawings, the vehicle suspension assembly comprises a wheel bearing assembly 1 and is designed as an integrated building block. The rolling bearing 2 and the wheel flange 3 are connected to each other by a positive connection. The rolling bearing 2 is pressed into a bore of the housing 4. The housing 4 is provided with two brake support arm members 5 that are integrally formed with the housing 4. It is understood that the wheel flange also can carry a brake disc (not shown in the drawing). The housing 4 can consist of high-grade nodular cast iron (GGG) or of steel. Thus, the housing 4 is strong enough to take the wheel bearing and the braking forces. Moreover, the housing 4 provides a good fit for the rolling bearing 2. Since nodular cast iron and steel used in manufacturing rolling bearings both have substantially the same thermal expansion coefficient, micro movements and cracking noises are avoided.

Figure 2:
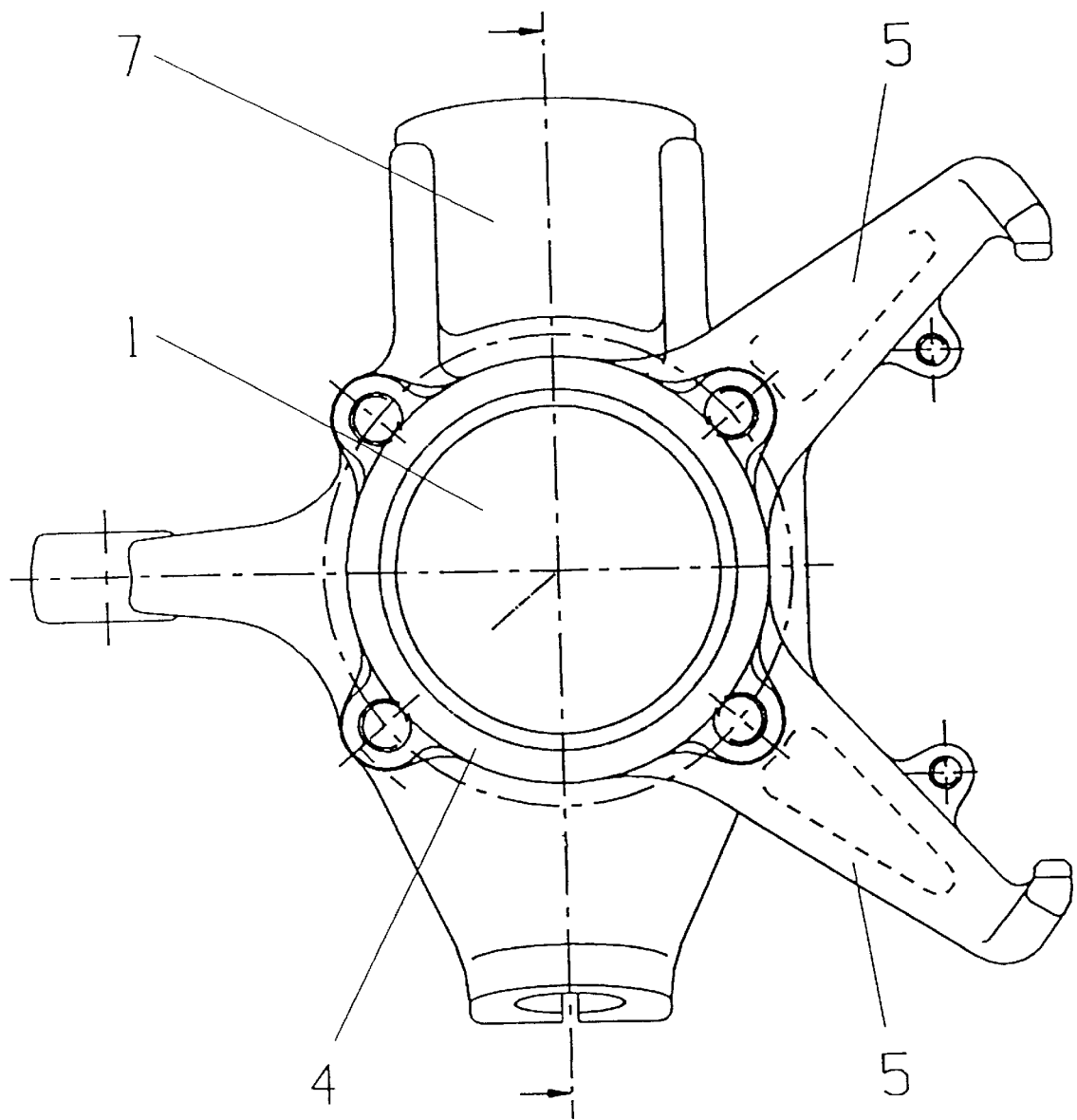
FIG. 2 shows a lateral view of the vehicle suspension assembly of FIG. 1.

The housing 4 with its wheel bearing assembly 1 is connected to the wheel support member 7 by means of screws 6. The wheel support member 7 preferably consists of aluminum and is provided with a circumferential protruding rib or shoulder 8. The rib or shoulder 8 of the embodiment shown in FIGS. 1-3 is resiliently deformable. Thus, if the housing 4 is connected to the wheel support member 7 and the screws 6 are tightened, the rib or shoulder 8 is resiliently deformed and rests against the outer race 1' of the rolling bearing 2 to put it under axial bias. In this way, any cracking noises are avoided.

Even if the protruding rib or shoulder 8 is shown as being part of the wheel support member 7 according to FIGS. 1 and 3, it is understood that the protruding rib or shoulder 8 could be part of the housing 4 (not shown). Thus, inaccuracies that may be caused by the double fit are equalized and an inadmissibly high bracing or rigging of the outer race 1' of the rolling bearing 2 upon tightening the screws 6 is avoided. Additionally, the danger of a break of the supporting flange 4' of the housing 4 is substantially reduced. A sheet metal cover member 9, preferably also made of aluminum, protects the rolling bearing from contamination.

In FIG. 2, the vehicle suspension assembly of FIG. 1 is shown in a lateral view whereby, for simplicity's sake, only the wheel bearing assembly 1 and the housing 4 with the brake support arm members 5 and the wheel support member 7 are designated.

Figure 4:
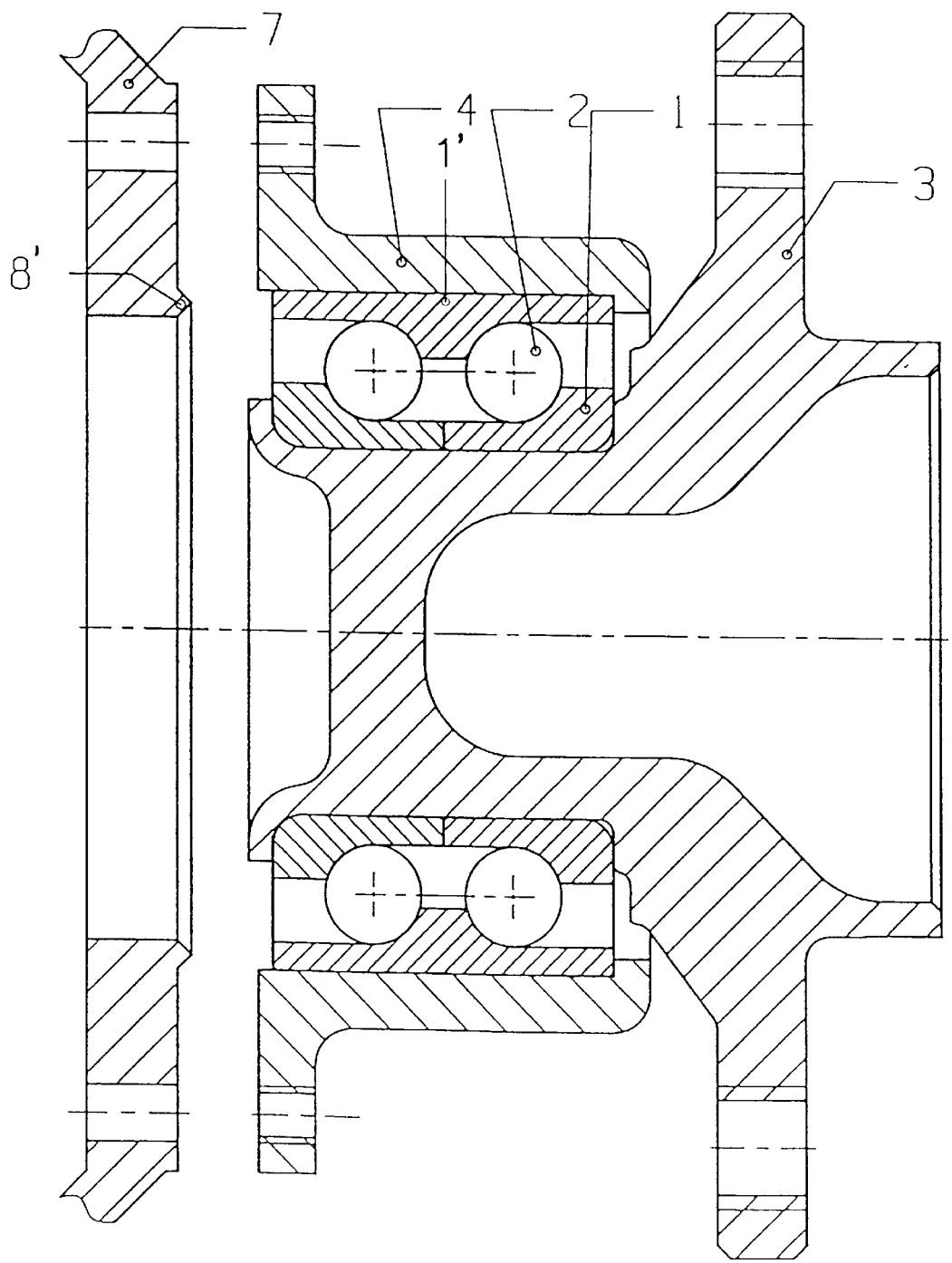
FIG. 4 shows a cross sectional view of a second embodiment of a vehicle suspension assembly according to the invention before assembly of the vehicle suspension assembly.
Figure 5:
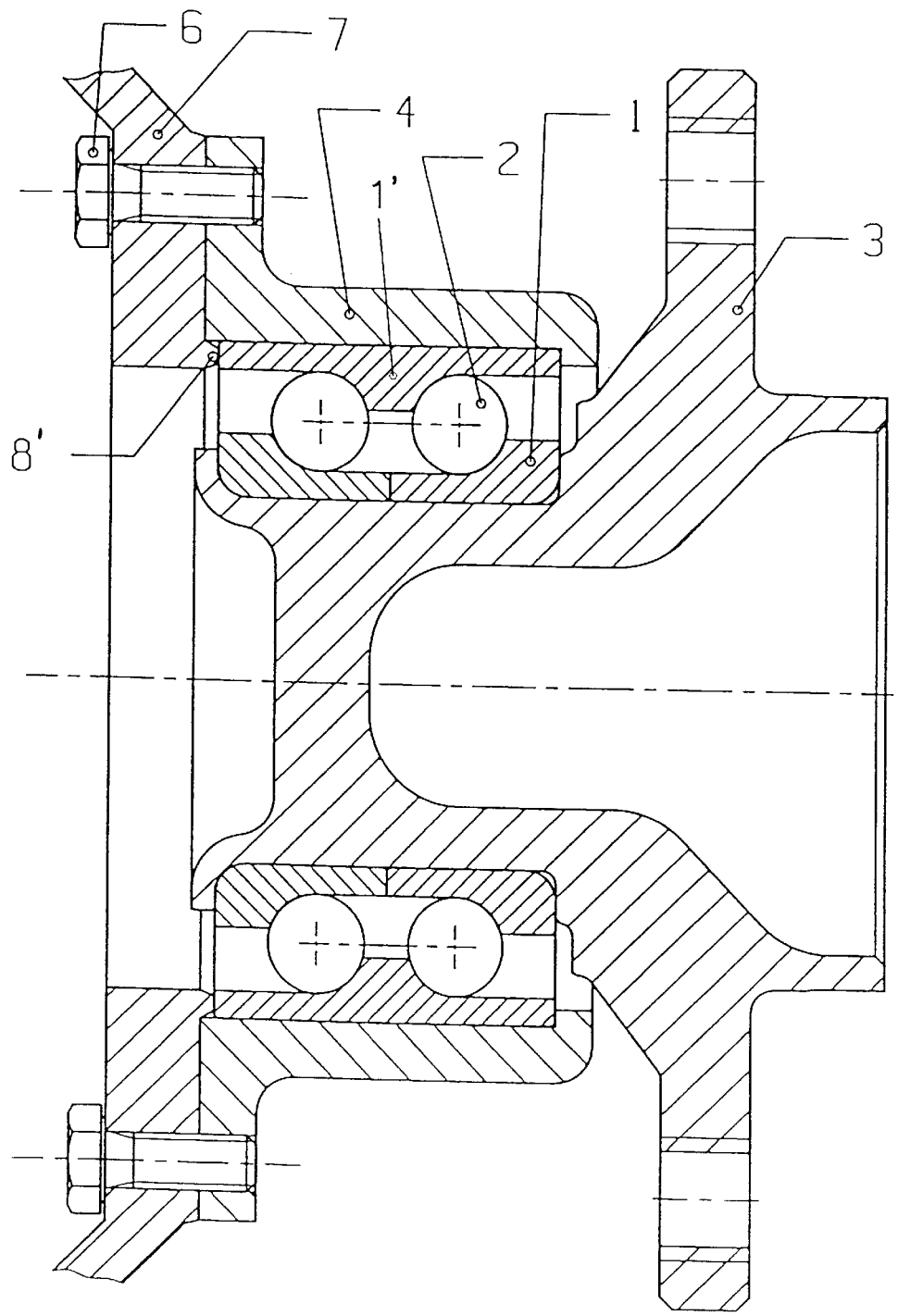
FIG. 5 shows a cross sectional view of the second embodiment of a vehicle suspension assembly according to the invention after assembly of the vehicle suspension assembly.

In FIG. 4, there is shown a cross sectional view of a second embodiment of a vehicle suspension assembly according to the invention before assembly. FIG. 5 shows a cross sectional view of the second embodiment of a vehicle suspension assembly according to the invention after assembly. The design of this second embodiment is very similar to that of the first embodiment. Thus, corresponding parts and elements have been designated with the same reference numerals.

As can be clearly seen in FIG. 4, the wheel support member 7 is provided with a circumferential protruding rib or shoulder 8' that is plastically deformable, in contrary to the rib or shoulder 8 of the first embodiment which is resiliently deformable. The plastically deformable rib or shoulder 8' presses only with a predetermined force onto the outer race 1' of the bearing assembly 1, 2 upon tightening the screws 6 (FIG. 5).

What is claimed is:

1. A vehicle suspension assembly comprising:

a wheel flange means;

a rolling bearing means having an inner race means connected to said wheel flange means and an outer race means;

a housing means having a cylindrical bore for receiving said outer race means of said rolling bearing means, said housing further having integrally formed brake support means;

a wheel support means for connecting to said housing means; and screw means for interconnecting said housing means to said wheel support means in such a way that said rolling bearing means received in said bore of said housing means is fixed in said housing means;

one of said wheel support means and said housing means having protruding means that is resiliently deformable and located in the region of a front face of said outer race means of said rolling bearing means.

2. A vehicle suspension assembly according to claim 1 in which said deformable protruding means is an annular rib or shoulder.

3. A vehicle suspension assembly comprising:

a wheel flange means;

a rolling bearing means having an inner race means connected to said wheel flange means and an outer race means;

a housing means having a cylindrical bore for receiving said outer race means of said rolling bearing means, said housing further having integrally formed brake support means;

a wheel support means for connecting to said housing means; and screw means for interconnecting said housing means to said wheel support means in such a way that said rolling bearing means received in said bore of said housing means is fixed in said housing means;

one of said wheel support means and said housing means having protruding means that is plastically deformable and located in the region of a front face of said outer race means of said rolling bearing means.

4. A vehicle suspension assembly according to claim 3 in which said deformable protruding means is an annular rib or shoulder.

* * * * *